United States Patent [19]

Thoms

[11] Patent Number: 4,632,726

[45] Date of Patent: Dec. 30, 1986

[54] MULTI-GRADED APERTURE MASK METHOD

[75] Inventor: Roland Thoms, Mullheim, Fed. Rep. of Germany

[73] Assignee: BMC Industries, Inc., St. Paul, Minn.

[21] Appl. No.: 630,776

[22] Filed: Jul. 13, 1984

[51] Int. Cl.[4] .......................... C23F 1/02; B44C 1/22; C03C 15/00; C03C 25/06

[52] U.S. Cl. .................................... 156/644; 156/640; 156/651; 156/656; 156/661.1; 313/402; 430/23; 430/312; 430/313; 430/318

[58] Field of Search ............... 156/640, 644, 651, 654, 156/656, 659.1, 661.1, 345; 430/23, 312, 313, 318; 313/402, 403

[56] References Cited

U.S. PATENT DOCUMENTS

| | | | |
|---|---|---|---|
| 2,690,518 | 9/1954 | Fyler et al. | 313/70 |
| 2,750,524 | 5/1956 | Braham | 313/86 |
| 3,329,541 | 7/1967 | Mears | 156/644 X |
| 3,574,013 | 4/1971 | Frantzen | 156/644 X |
| 3,652,895 | 3/1972 | Tsuneta et al. | 313/855 |
| 3,663,997 | 5/1972 | Kuznetzoff | 29/25.14 |
| 3,679,500 | 7/1972 | Kubo et al. | 156/644 X |
| 3,770,434 | 11/1973 | Law | 96/36.1 |
| 3,787,939 | 1/1974 | Tomita et al. | 313/855 |
| 3,788,912 | 1/1974 | Frantzen et al. | 156/640 |
| 3,809,945 | 5/1974 | Roeder | 313/855 |
| 3,839,108 | 10/1974 | Leinkram | 156/644 X |
| 3,882,347 | 5/1975 | Suzuki et al. | 313/403 |
| 3,883,770 | 5/1975 | Yamada et al. | 313/403 |
| 3,916,243 | 10/1975 | Brown | 313/403 |
| 3,929,532 | 12/1972 | Kuzminski | 156/644 X |
| 3,971,682 | 7/1976 | Frantzen et al. | 156/345 X |
| 3,973,965 | 8/1976 | Suzuki | 313/403 X |
| 4,021,276 | 5/1977 | Cho | 156/644 |
| 4,069,085 | 1/1978 | Buysman et al. | 156/345 |
| 4,168,450 | 9/1979 | Yamauchi et al. | 313/403 |
| 4,293,792 | 10/1981 | Roberts | 313/403 |
| 4,303,466 | 12/1981 | Thoms | 156/626 |
| 4,353,948 | 10/1982 | Thoms | 428/131 |
| 4,389,592 | 6/1983 | Thoms | 313/403 |

FOREIGN PATENT DOCUMENTS

| | | |
|---|---|---|
| 2020892 | 11/1979 | United Kingdom . |
| 2067827 | 7/1981 | United Kingdom . |

*Primary Examiner*—William A. Powell
*Attorney, Agent, or Firm*—Jacobson and Johnson

[57] ABSTRACT

The process of forming a plurality of openings in an aperture mask by applying a layer of etchant resist to opposite surfaces of an aperture mask material, determining an overetch factor for the aperture mask, laying out a pattern of openings in the etchant resist on one side of the aperture mask, laying out a pattern of openings in the etchant resist on the opposite side of the aperture mask wherein the size of the openings on one side of the mask in the etchant resist increase while the size of the openings in the etchant resist on the opposite side decrease, and etching the aperture mask material through the openings in the etchant resist.

9 Claims, 16 Drawing Figures

FIG 3
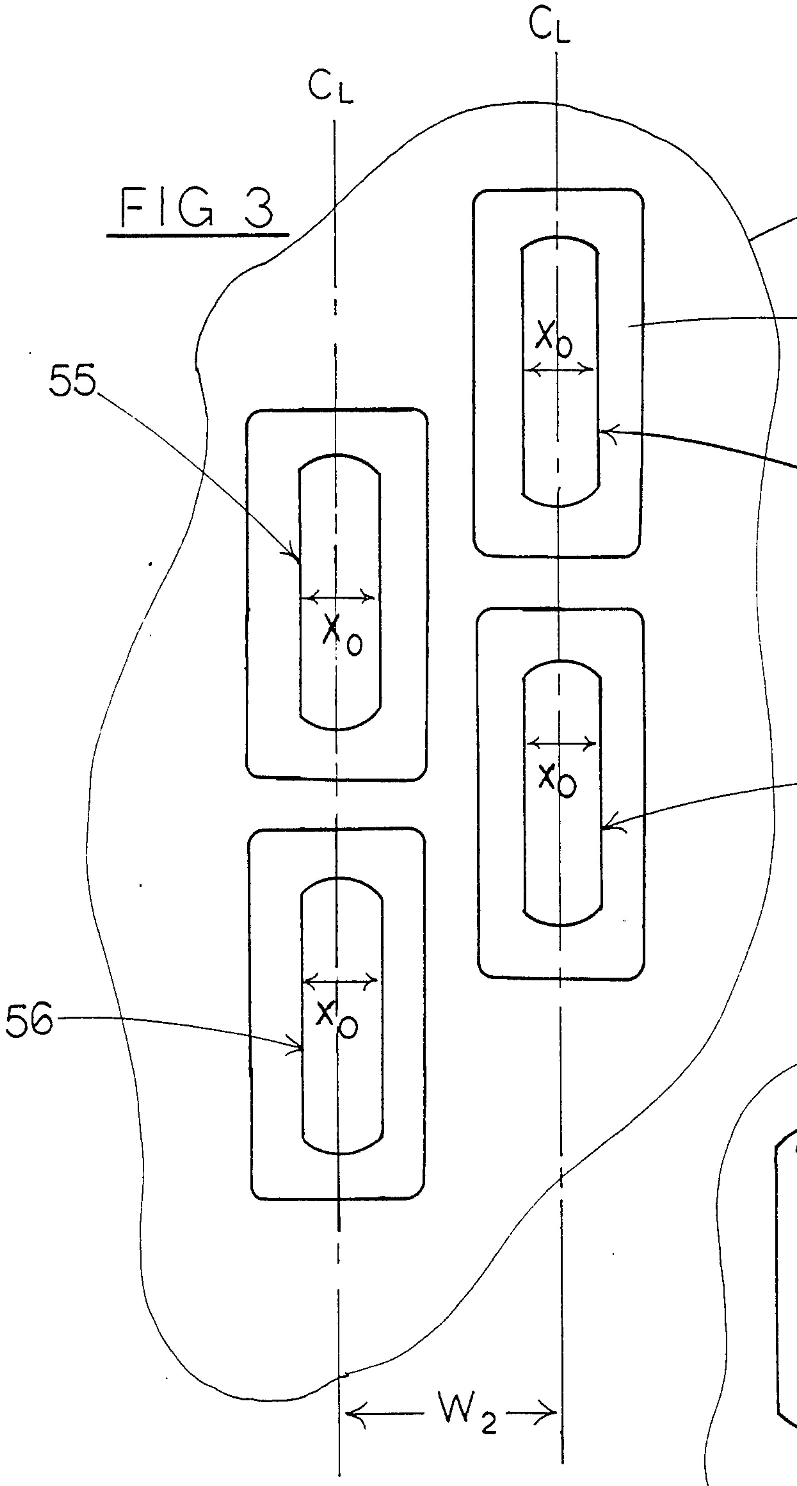
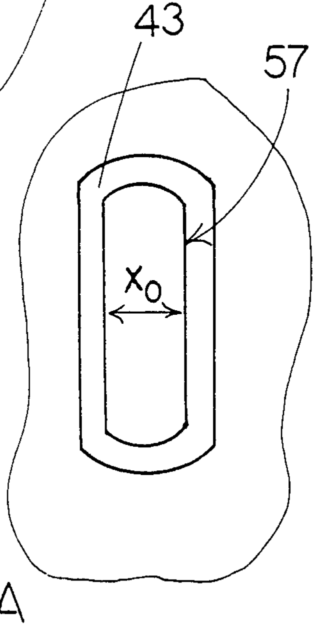
FIG 3A

FIG 4
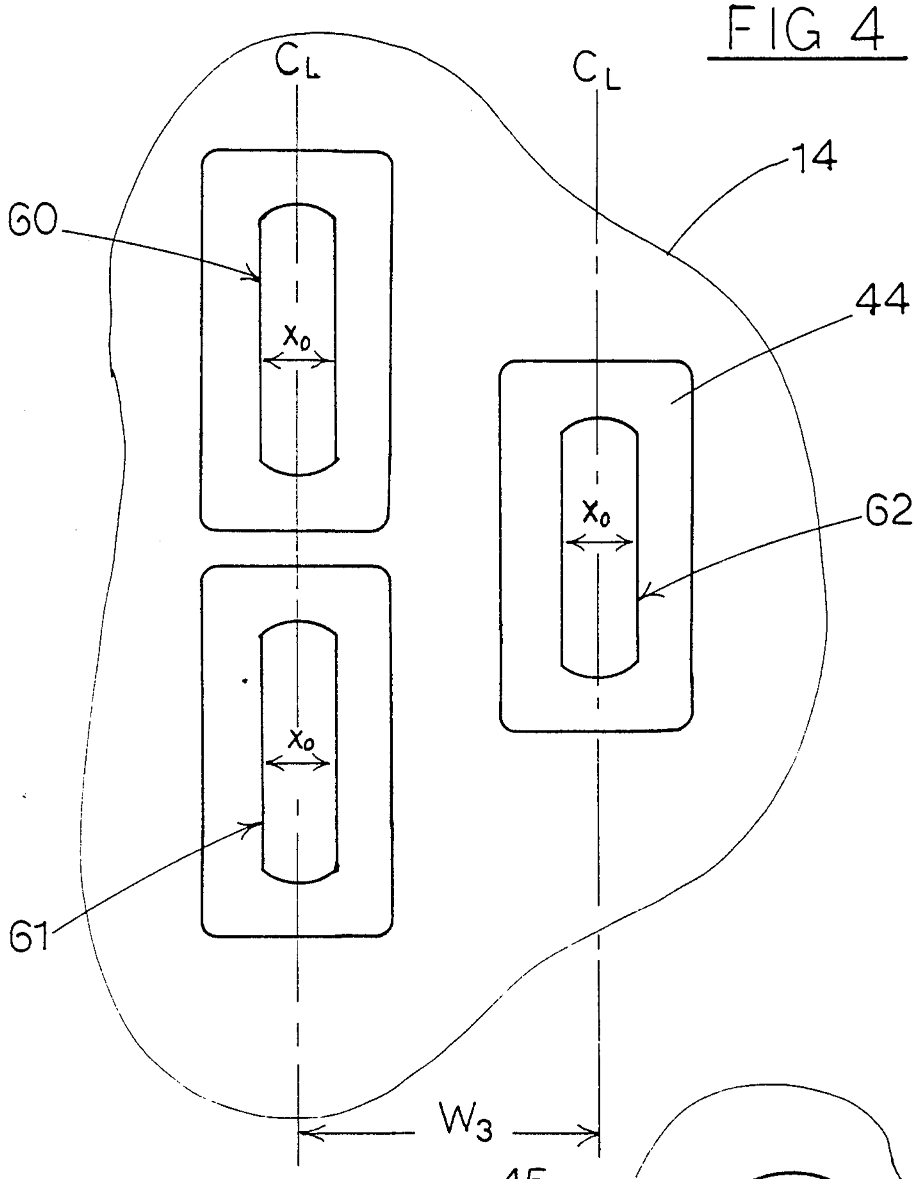
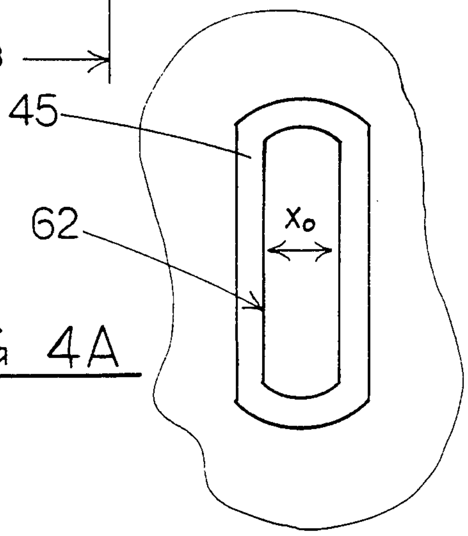
FIG 4A

FIG. 9 is a graph of the grade side resist opening as function of the lateral distance from the center of the mask;

FIG. 10 is a graph of the size of the cone side resist opening as a function of the lateral distance from the center of the mask;

FIG. 11 is a graph of the over-etch factor as a function of the lateral distance from the center of the mask;

FIG. 12 is a graph of the aperture slot width as a function of the lateral distance from the center of the mask;

FIG. 13 is a graph of the distance of the aperture throat from the cone side of the mask as a function of the lateral distance from the center of the mask.

DESCRIPTION OF THE PREFERRED EMBODIMENT

Referring to FIG. 1 reference numeral 10 designates an aperture mask having a plurality of rows of apertures 11 therein with reference letter C identifying a vertical line through the center of aperture mask 10 and reference letter P identifying a vertical line through the periphery of aperture mask 10. Three discrete areas of the mask are identified by reference numerals 12, 13 and 14. Reference numeral 12 identifies a set of four apertures in the center of the mask, reference numeral 14 identifies a set of three apertures in the periphery of the mask and reference numeral 13 identifies a set of four apertures somewhere between the center and the periphery of the mask. The rows of apertures in aperture mask 10 have a predetermined spacing at the center of the mask while the peripheral spacing of the rows is wider than at the center of the mask.

FIGS. 2, 3 and 4 provide greater detail of the apertures and their spacing by showing enlarged areas 12, 13 and 14 of aperture mask 10 as viewed from the cone side of the mask while FIGS. 2A, 3A and 4A show an aperture as viewed from the grade side of the resist.

FIG. 2 shows area 12 with four apertures (center of the mask) 50, 51, 52 and 53 in which the aperture width is designated by $X_o$. FIG. 2A shows aperture 52 as viewed from the grade side. Typically, the apertures are located in a staggered side by side relationship with the spacing (pitch) between adjacent rows of apertures denoted by dimension $W_1$. Located around aperture 52 on the cone side of the aperture mask 10 is a partly etched region 40 and located around aperture 52 on the grade side of the aperture mask 10 is a partially etched region 41.

Similarly, FIG. 3 shows a cone side enlarged view of area 13 containing apertures 55, 56, 57 and 58 and FIG. 3A shows an enlarged grade side view of aperture 57. Located around aperture 57 on the cone side of aperture mask 10 is a partly etched region 42 and located around aperture 52 on the grade side of aperture mask 10 is a partially etched region 43. The area of the partially etched region 42 around aperture 57 is larger than the partially etched region 40 shown in FIG. 2 while the partially etched grade side region 43 is smaller than the partially etched grade side region 41. The spacing between adjacent rows of the apertures is denoted by dimension $W_2$ and is somewhat greater than the dimension $W_1$. However, the width ($X_o$) of openings of the aperture is the same as those shown in FIG. 2.

FIG. 4 shows enlarged area 14 with apertures 60, 61 and 62 which are located at the periphery of the aperture mask. The apertures at the periphery of the mask have greater spacing between rows (denoted by $W_3$) than those in regions 12 and 13 but the width of the individual aperture ($X_o$) is the same as the width of the apertures shown in FIGS. 2 and 3.

Located around aperture 62 on the cone side of aperture mask 10 is a partially etched region 44 and located around aperture 62 on the grade side of aperture mask 10 is a partially etched region 45. The area of partially etched region 44 is larger than the corresponding areas 42 and 40 shown in FIG. 2 and FIG. 3 while the area of partially etched region 45 is smaller than the partially etched region 41 and 43 shown in FIG. 2 and FIG. 3. In the embodiment shown the apertures are maintained at a constant width while the spacing of the apertures is varied. In some instances both the spacing and the width could be varied. As a general rule, the length of the apertures remains constant; however, if desired the length could be varied. Since one of the objectives is to obtain greater light transmission at the center of the aperture mask than at the periphery of the mask while not affecting the strength of the mask or the magnetic or thermal characteristics of the aperture mask it is apparent that within certain bounds dictated by the factors of magnetic thermal and strength requirements the size and spacing of the openings in the aperture mask can be varied. To understand what is occurring in the aperture mask the embodiment in which the aperture size remains constant or substantially constant through the mask will be related to the over-etch factor and to the counter grading of the size of the resist openings in the cone side and the grade side.

To illustrate the over-etch factor which is used with the process of the present invention reference should be made to FIGS. 5 and 7 which show sectional side views across an aperture mask material 16. Mask material 16 is sandwiched between a grade side resist film 15 and a cone side resist film 17. FIG. 5 shows the width of the opening in grade side resist film 15 as designated by $G_c$ and the width of the opening in the cone side resist film 17 as designated by $C_c$. Reference numeral 20 identifies a dotted line that represents the shape and depth of how a grade side recess would appear if etched for a given time, t, from only the grade side. The maximum depth of the etched recess is $D_o$ with the maximum width of the recess slightly larger than the width $G_c$ of the opening in resist 15. As a general rule, the size of the etched recess would be larger if etching were allowed to continue for an additional time greater than t and smaller if etching were permitted for a time less than t.

Reference numeral 21 identifies a dotted line that represents the shape and depth of how a cone side etched recess would appear if etched only from the cone side for the same time t as the grade side recess. Note, in FIG. 5 the dimension $C_c$ is about the same size as the grade side resist gpening dimension $G_c$ and the maximum depth of grade side recess ($D_o$) is about the same as the maximum cone side resist ($D_1$).

When the projected etched regions are superimposed as shown in FIG. 5 the bottom of the projected recess regions 20 and 21 extend past each other a distance which is designated by "a" and is known as the over-etch factor. The over-etch factor is more fully described in my U.S. Pat. No. 4,303,466. Briefly, the over-etch factor is not an actual over-etching but an indication of how much the projected etched recess regions extend beyond each other if etched separately from the cone side and the grade side. One would normally assume that the actual etched openings through material 16 would be defined by the outer portions of the solid lines

MULTI-GRADED APERTURE MASK METHOD

BACKGROUND OF THE INVENTION

1. Field of the Invention

This invention relates generally to television aperture masks and, more specifically, to a process for forming openings of substantially the same sizes in a television aperture mask.

2. Description of the Prior Art

The concept of aperture masks for television picture tubes is well known in the art. A typical prior art aperture mask is shown in the Braham U.S. Pat. No. 2,750,524 which shows an aperture mask having a plurality of circular openings.

The operation of such aperture masks in a television picture tube may be found in the Fyler, et al. U.S. Pat. No. 2,690,518 which shows a color television tube having an aperture mask located as an electron beam screen.

The prior art aperture mask openings have taken many different shapes including round as shown in the aforementioned patents or elongated as shown in the Suzuki, et al. U.S. Pat. No. 3,883,347. While the shape of the opening may vary in different masks, generally all masks require the open area in the aperture mask to be graded to accommodate the characteristics of the human eye. That is, if a television picture is to appear uniform in brightness to the human eye, it is necessary to have a television picture where the central area of the television picture is actually brighter than the peripheral area. To obtain a brighter central area the aperture masks are usually made with larger size openings in the center of the mask and smaller size openings in the periphery of the mask with openings of intermediate sizes located therebetween. As the brightness of a television picture tube is directly proportional to the open area of the aperture mask, the use of a constant density of apertures with gradually decreasing size produces an image that appears uniform in brightness to the human eye. Typically, the brightness at the center of the aperture mask, is greater than at the peripheral region of the aperture mask.

The prior art Tsuneta, et al. U.S. Pat. No. 3,652,895 shows an aperture mask having a plurality of rectangular slots or circular openings with the size of the openings decreasing in size from the center of the mask to the peripheral portion of the mask. FIG. 13 of the Tsuneta, et al. patent also shows an alternate concept in which instead of varying the aperture size, the space between apertures is increased to thereby decrease the open area on the peripheral regions of the mask. While the concept of decreasing the density of apertures in the periphery of the aperture mask is well known, the method of making an aperture mask with substantially the same size openings and within proper tolerances has been quite difficult. The prior art Tsuneta U.S. patent states that he obtains rectangular slots by etching most part of the thickness of the mask plate from the upper side and then etching the remaining part from the lower side of the plate.

Still another method of decreasing the size of the openings in an aperture mask is taught in the Frantzen, et al. U.S. Pat. No. 3,788,912. Frantzen, et al. teaches the nozzle position and the amount of spray can be varied to provide larger or smaller openings in selected regions of the mask. In the Frantzen technique the openings in the photoresist are of equal dimensions throughout the aperture mask with control of the aperture size obtained through controlling the etchant supply.

Typical aperture masks in use today are made from a base material and have a cone side surface and a grade side surface. The cone side surface comprises a set of hollowed out recess regions located on one side of the aperture mask. Located in the hollowed out recess region is an elongated or circular aperture. The side opposite the cone side surface is known as the grade side surface.

To enlarge the apertures one may vary the spray time in mass production lines or adjust a series of multiple etching stations such as shown in Frantzen U.S. Pat. No. 3,788,912. However, such techniques are difficult to use and depend a great deal on the skill of the operator.

The invention shown in my U.S. Pat. No. 4,303,466 teaches the sizing of etchant resist openings located on the cone side of an aperture mask by varying the cone size opening in the etchant resist while maintaining constant size grade side openings yet maintaining a substantial constant over-etch factor throughout the aperture mask even though the size of the cone side etchant resist openings and the openings in the aperture mask vary throughout the aperture mask.

BRIEF SUMMARY OF THE INVENTION

Briefly, the present invention comprises a method of varying the opposing resist and grade side openings to produce counter grading effects of the cone side resist openings and the grade side resist openings to permit the size of the openings in the aperture mask to remain substantially constant while also varying the position of the throat or minimum dimension of the openings in the aperture mask and the size of the partially etched areas surrounding the openings in the aperture mask to permit the aperture mask to be etched from opposite sides.

BRIEF DESCRIPTION OF THE DRAWING

FIG. 3 is an enlarged view of a second set of elongated apertures of the aperture mask of FIG. 1;

FIG. 3A is an enlarged grade side view of one of the elongated apertures shown in FIG. 3;

FIG. 4 is an enlarged view of a third set of elongated apertures of the aperture mask of FIG. 1;

FIG. 4A is an enlarged grade side view of one of the elongated apertures shown in FIG. 4;

20 and 21 as shown in FIG. 5 however the actual size and shape of an etched opening through material 16 has a more rounded interior opening as shown in FIG. 6. FIG. 6 shows aperture 52 which has a width $X_o$. To illustrate what happens when both the size of the cone side resist opening and the size of the grade side resist opening are varied while the over-etch factor is kept constant reference should be made to FIG. 7. FIG. 7 shows resist openings in film 15 and film 17 in which the size of both the grade side resist opening and the size of the cone side resist opening have been varied from those shown in FIG. 5. The width of opening in the grade side resist is designated by $G_p$ and the width of the opening in the cone side resist film 17 is designated by $C_p$ with the width $G_p$ less than the width $G_c$ and the width $C_p$ greater than the width $C_c$. Typically, FIG. 5 shows the comparative grade side and cone side resist openings that would be used in the center of the mask while FIG. 6 shows the comparative grade side and cone side resist openings that would be used at the periphery of the mask. Reference numeral 23 identifies a dotted line that represents the shape and depth of a grade side recess as it would appear if etched for a given time, t, from only the grade side. The maximum depth of the etched recess 23 is $D_2$ with the maximum width of the recess slightly larger than the width of the opening in resist 15.

Figure 5:
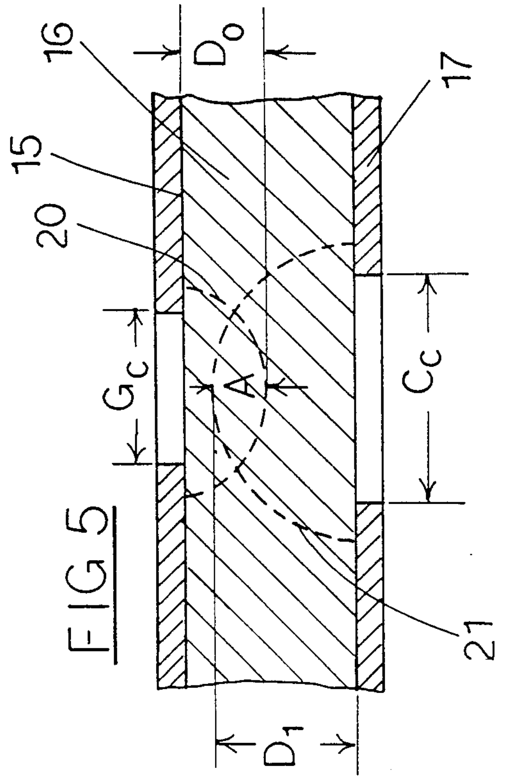
FIG. 5 is a cross sectional view of a projected etch recess on the cone side and grade side of an aperture mask.

Identified by reference numeral 22 is a dotted line that represents the shape and depth of how a cone side etched recess would appear if etched only from the cone side for the same time, t, as the grade side recess. Note, dimension $C_p$ is much larger than the dimension $G_p$ and the maximum depth of the cone side etched recess $D_3$ is much larger than the maximum depth of the grade side etched recess ($D_2$). Thus, for a given time, t, the size and shape of the projected recess on opposite sides of the aperture mask are different even though other parameters such as etchant temperature or Baume are held constant. The distance that each of the projected recess regions 22 and 23 extend beyond each other is designated as "a" and is the same dimension "a" as shown in FIG. 5 and which is referred to as the over-etch factor.

Figure 1:
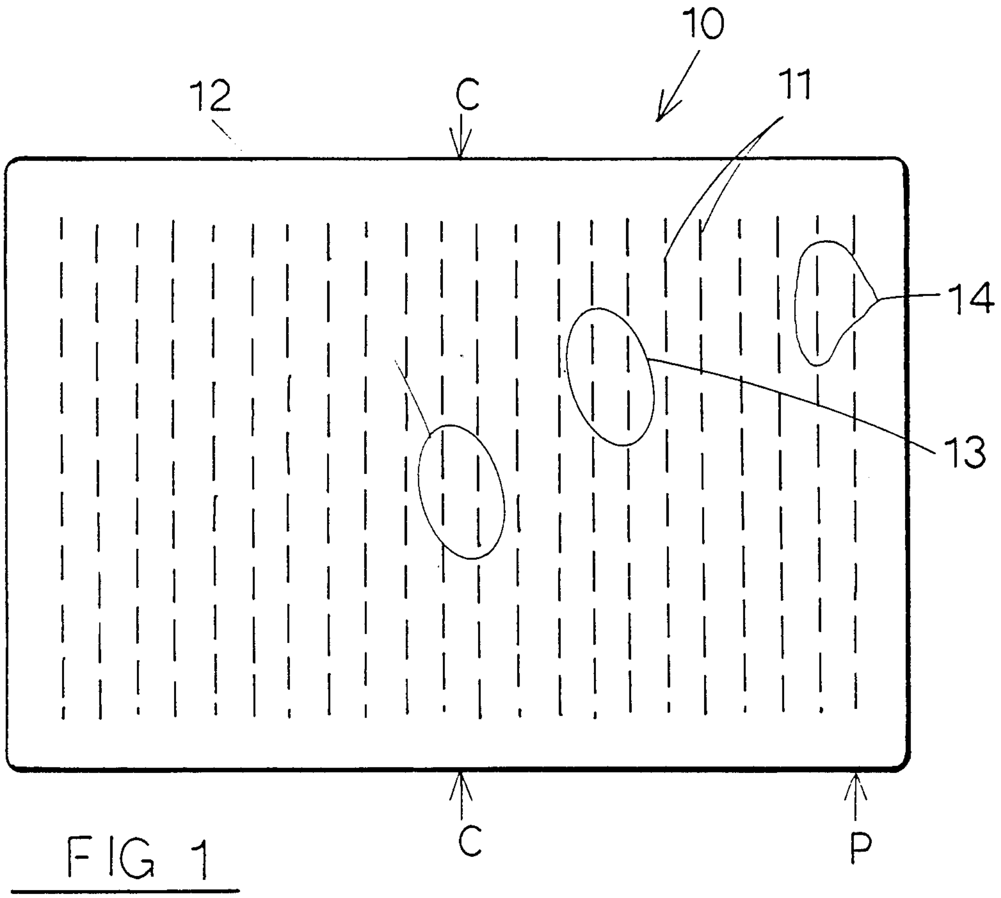
FIG. 1 is a front view of a television aperture mask.
Figure 2:
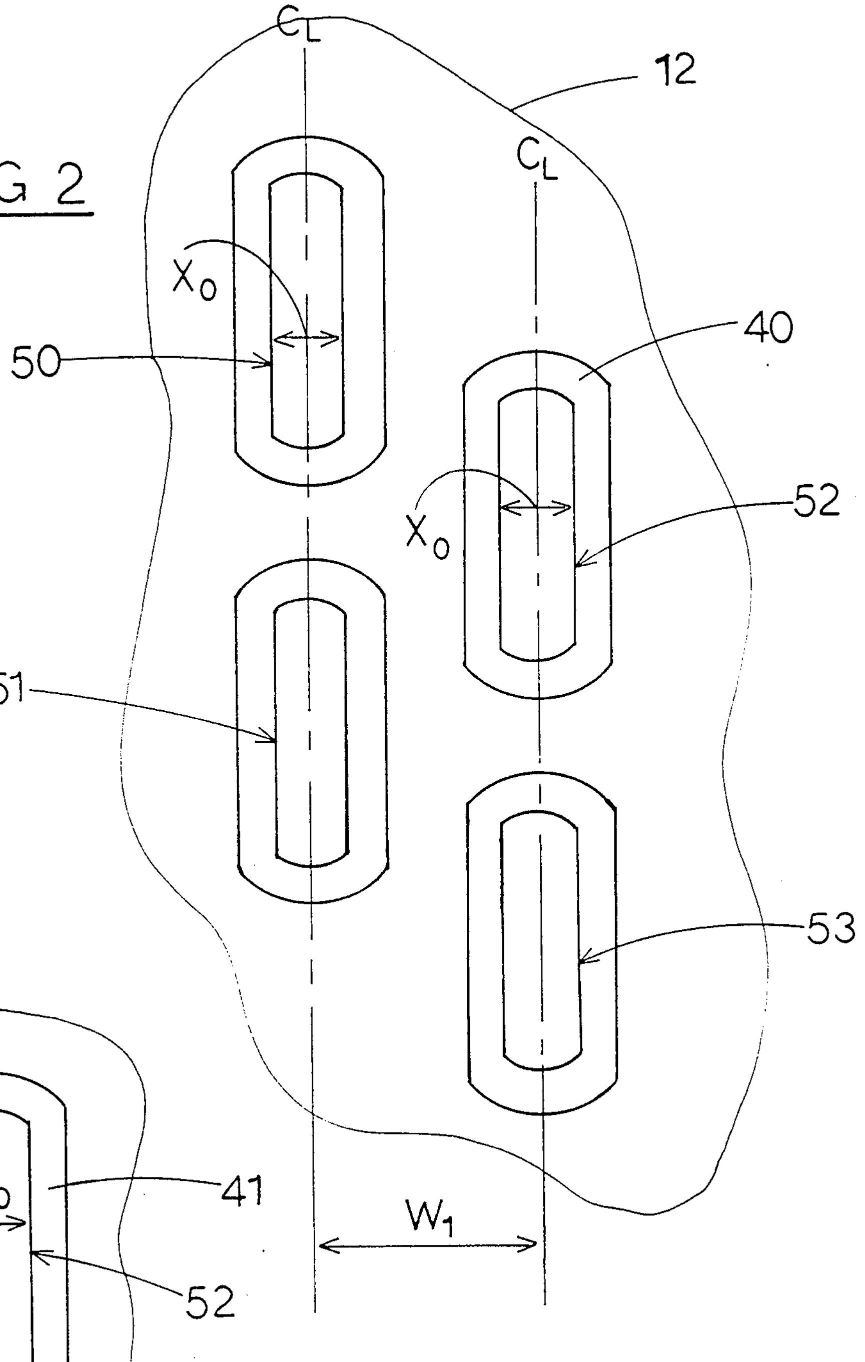
FIG. 2 is an enlarged cone side view of a set of elongated apertures of the mask of FIG. 1.
Figure 2A:
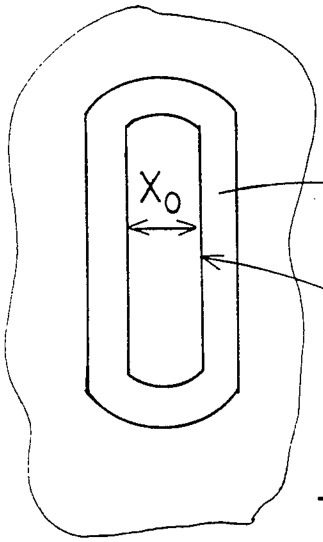
FIG. 2A is an enlarged grade side view of one of the elongated apertures shown in FIG. 2.
Figure 6:
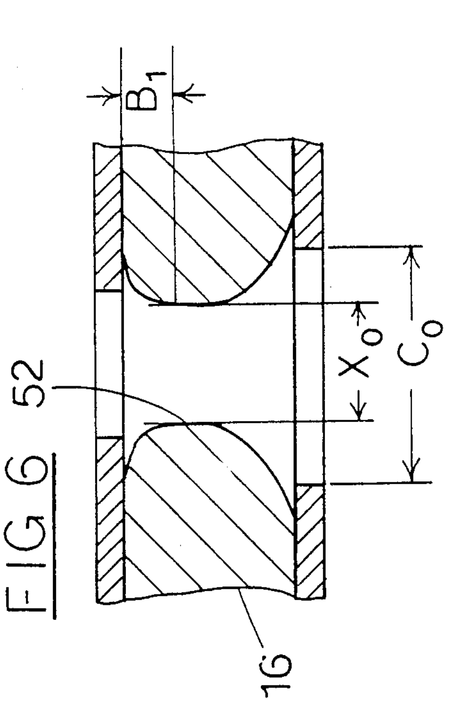
FIG. 6 is a cross sectional view of an etched aperture etched in accordance with the resist pattern shown in FIG. 5.
Figure 8:
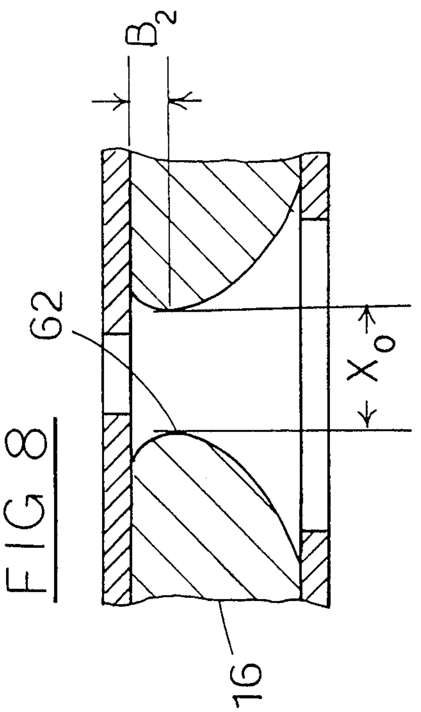
FIG. 8 is a cross sectional view of an etched aperture etched in accordance with the resist pattern shown in FIG. 7.
Figure 7:
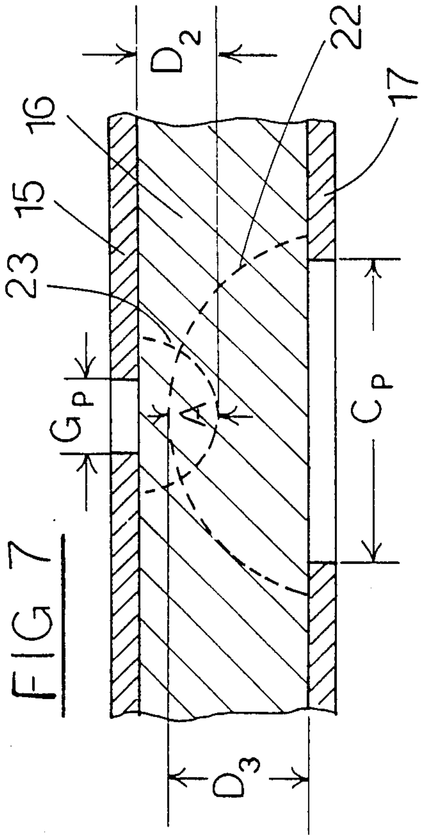
FIG. 7 is the cross sectional view of a projected etched recess on the cone side and grade side of an aperture mask.

FIG. 8 shows how material 16 shown in FIG. 7 would appear if etched simultaneously from both sides. It is noted that the width of the opening in aperture 62 is denoted by $X_o$ which is the same width as the width of aperture 52 shown in FIG. 6. Thus, even though the cone side resist openings have increased and the grade side resist openings have decreased from those shown in FIG. 5, the final size of the opening through the aperture mask has. been kept constant. To illustrate an example of how the compensating grading of the size of the opening in the cone side resist and the size grade side resist can provide useful results it should be understood that for reasons associated by placement of the aperture mask in a television tube it is generally beneficial to have a larger cone side mass area in the center of the mask than at the periphery of the mask. It is also beneficial to reduce beam reflection by having the throat of the aperture (minimum dimension) nearer the grade side at the periphery of the mask than at the center of the aperture mask. If one wants to maintain a constant width of the opening through the aperture mask (substantially the same dimension $X_o$) while varying the size of the openings on the cone side and the grade side of the mask one can readily use the process of my invention.

Figure 9:
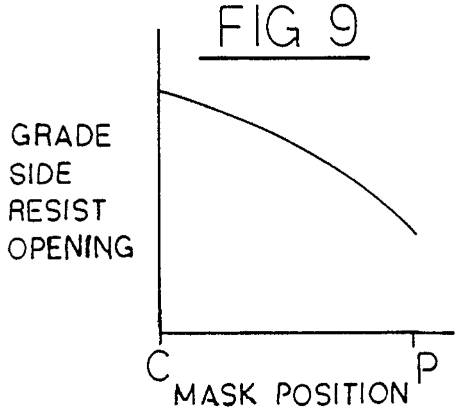
Figure 10:
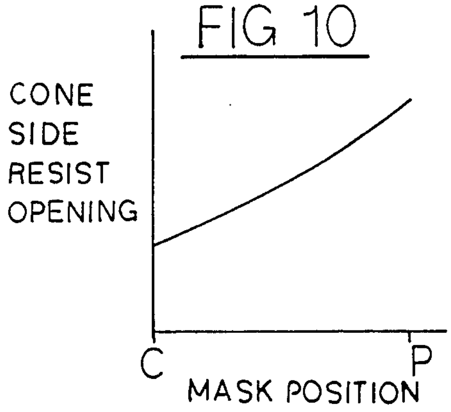
Figure 11:
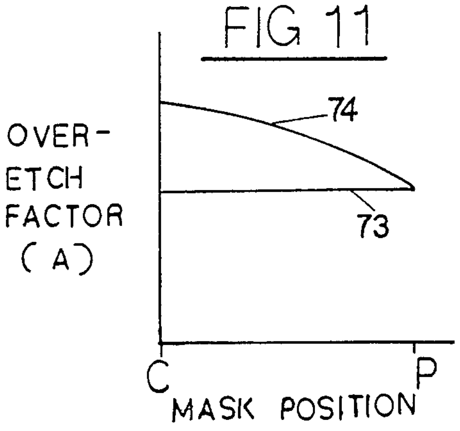
Figure 12:
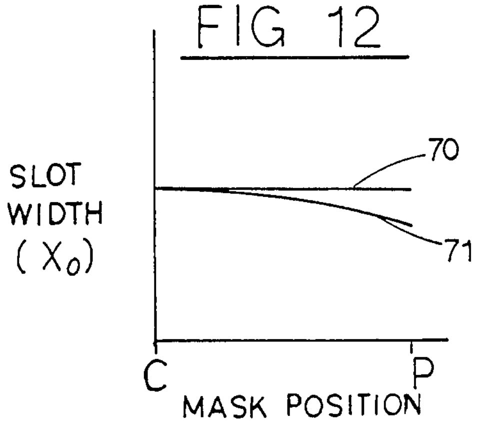

To illustrate what is happening throughout the aperture mask one should refer to FIGS. 9 and 10 which show a graph of the size of the grade side resist opening as a function of the lateral position from the center of the mask to the periphery of the mask. FIG. 10 shows a graph of the size of the cone side resist opening as a function of the lateral position from the center of the mask to the periphery of the mask. It is noted that the size of the grade side resist opening 10 generally decreases at a first predetermined rate from the center to the periphery of the mask while in contrast the size of cone side resist opening which is shown in FIG. 10 increases at a second predetermined rate from the center of the mask to the periphery of the mask. In general, it is preferred to have the cone side width increase in such a way as to maintain a constant over-etch factor throughout the aperture mask; however, in certain applications one may want to uniformly increase or uniformly decrease the openings in the periphery of the mask by slightly increasing or slightly decreasing the over-etch factor in the periphery of the mask. Generally, for these applications the over-etch factor is increased or decreased less than 10% at the periphery of the mask. The particular manner or rate that both of the resist openings increase or decrease is of secondary concern. If the over-etch factor 73 is kept constant as shown in FIG. 11 one can obtain a constant slot width throughout the aperture mask (FIG. 12 line graph 70). FIG. 11 also shows the over-etch factor (line 74) decreasing from the center of the mask to the periphery of the mask. Line 71 in FIG. 12 shows the corresponding decrease in slot width from the center of the mask to the periphery of the mask. Thus, it will be appreciated that one can deliberately decrease or increase the over-etch factor to obtain a corresponding decrease or increase in the size of the apertures.

Figure 13:
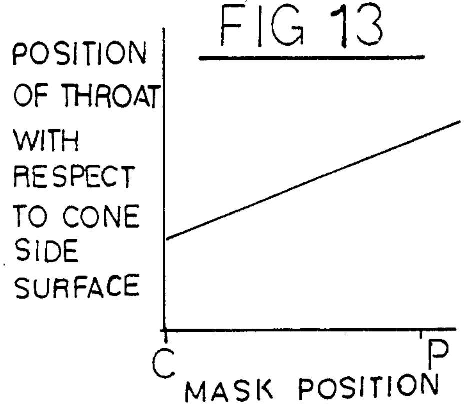

Correspondingly, FIG. 13 shows the throat position with respect to the cone side surface plotted as a function of the position from the center of the mask to the periphery of the mask. It is noted that the throat is closer to the cone side at the center of the mask but further away at the periphery of the mask.

I claim:

1. The process of forming a plurality of openings in an aperture mask having a center and a periphery area comprising:

applying a layer of etchant resist to opposite surfaces of an aperture mask material;

determining an over-etch factor for the aperture mask;

laying out a pattern of openings in the etchant resist on one side of the aperture mask;

laying out a pattern of openings in the etchant resist on the opposite side of the aperture mask wherein the size of the openings on one side of the mask in the etchant resist increase while the size of the openings in the etchant resist on the opposite side decrease;

etching the aperture mask material through the openings in the etchant resist.

2. The process of claim 1 wherein the over-etch factor is substantially constant throughout the aperture mask.

3. The process of claim 2 wherein the aperture mask is etched from both sides.

4. The process of claim 3 wherein the etchant spray is maintained in a uniform spray pattern on opposite sides of the aperture mask.

5. The process of claim 4 wherein the aperture mask openings are elongated slots with the spacing of the slots varied in accordance with the relative position of the openings in the aperture mask.

6. The process of claim 5 wherein the aperture mask is simultaneously etched from both sides.

7. The process of claim 1 including the step of making the openings substantially the same size throughout the mask.

8. The process of claim 1 wherein the over-etch factor is continuously increased or continuously decreased from the center of the aperture mask to the periphery of the aperture mask.

9. The process of claim 8 wherein the over-etch factor is not allowed to increase or decrease over 10% from the center of the mask to the periphery of the mask.

* * * * *